United States Patent [19]

Petrelli

[11] Patent Number: 5,285,047
[45] Date of Patent: Feb. 8, 1994

[54] METHOD AND APPARATUS FOR PREVENTING CARRY BACK IN A RAIL CAR USING AN ON-BOARD HEATING DEVICE

[76] Inventor: Michael S. Petrelli, 100 Rice Ave., Sheridan, Wyo. 82801

[21] Appl. No.: 925,211

[22] Filed: Aug. 6, 1992

[51] Int. Cl.$^5$ .................. B61D 3/00; H05B 3/00
[52] U.S. Cl. ................... 219/202; 237/28; 105/451
[58] Field of Search ............ 219/202; 105/451; 165/41–44; 237/43, 28

[56] References Cited

U.S. PATENT DOCUMENTS

| 2,766,705 | 10/1956 | Flowers | 105/451 |
| 3,286,079 | 11/1966 | Hynes et al. | |
| 3,731,053 | 5/1973 | Coyle et al. | 219/202 |
| 4,078,729 | 10/1976 | Foltz | |
| 4,414,462 | 11/1983 | Price | 219/202 |
| 4,585,178 | 4/1986 | Arzt | |

FOREIGN PATENT DOCUMENTS

| 936147 | 12/1955 | Fed. Rep. of Germany | 105/451 |
| 2924520 | 1/1980 | Fed. Rep. of Germany | 105/451 |
| 3139539 | 4/1983 | Fed. Rep. of Germany | |
| 1114957 | 4/1956 | France | 105/451 |
| 241051 | 11/1986 | German Democratic Rep. | 105/451 |
| 253236 | 1/1988 | German Democratic Rep. | 105/451 |
| 275848 | 2/1990 | German Democratic Rep. | 105/451 |
| 280940 | 7/1990 | German Democratic Rep. | 105/451 |
| 3-258610 | 11/1991 | Japan | 237/43 |
| 1558793 | 4/1990 | U.S.S.R. | 105/451 |
| 2067522 | 1/1980 | United Kingdom | |

*Primary Examiner*—Bruce A. Reynolds
*Assistant Examiner*—John A. Jeffery
*Attorney, Agent, or Firm*—Gene Wan

[57] ABSTRACT

A method and apparatus for eliminating carry-back includes one or more heat shrouds located at desired locations to avoid carry-back. The heat shrouds which may be powered by being connected to a rotating shaft of a material transportation device to avoid the need for additional power sources. The apparatus further includes a passive drying system for removing moisture from material while in transit.

5 Claims, 2 Drawing Sheets

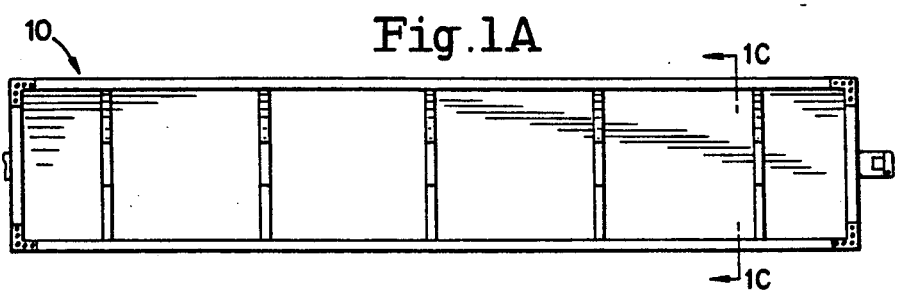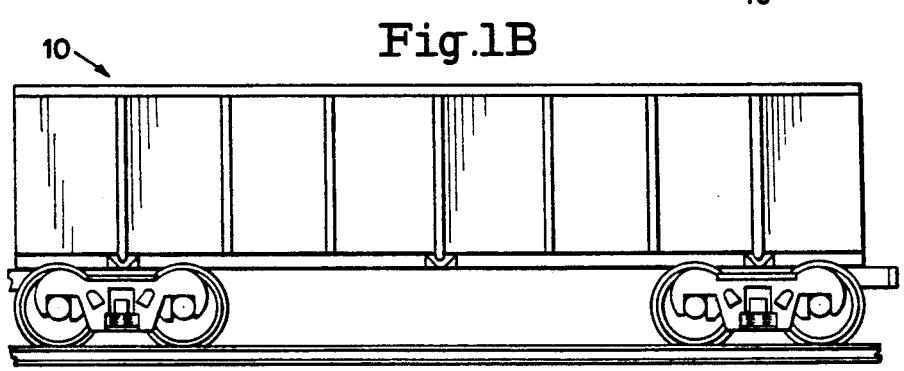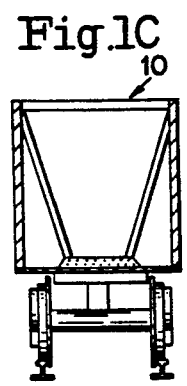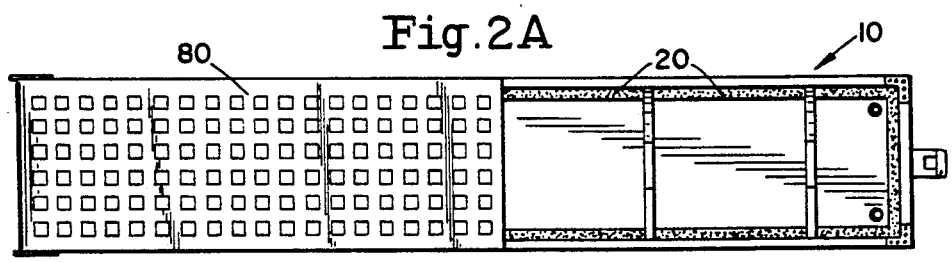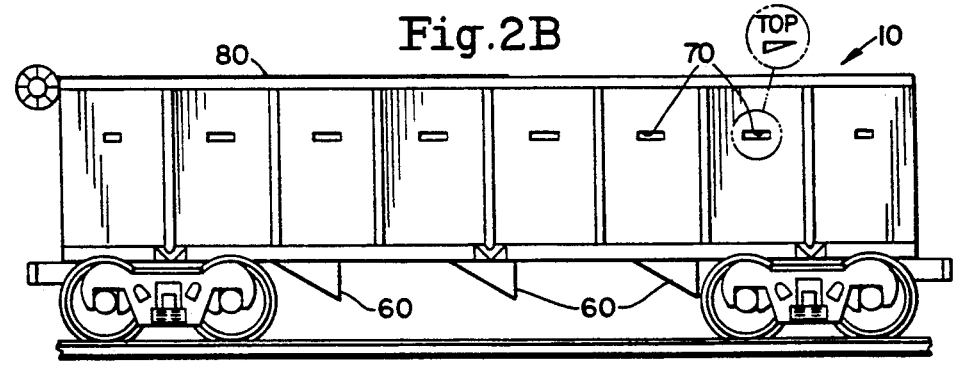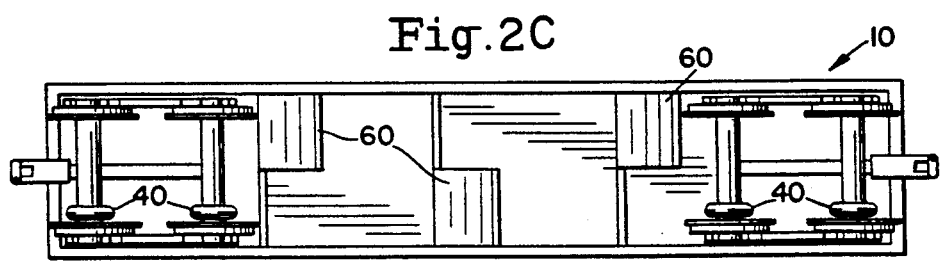

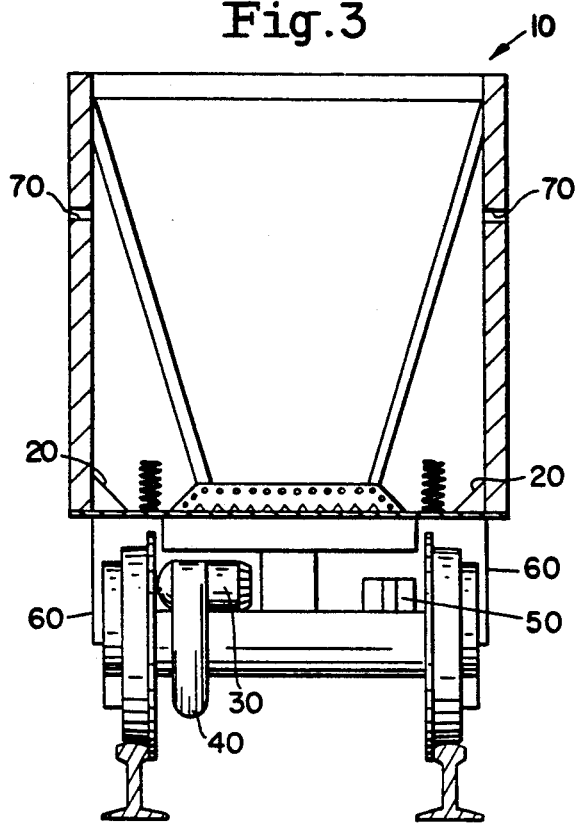
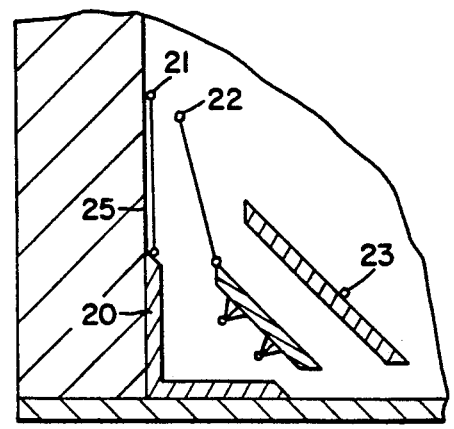
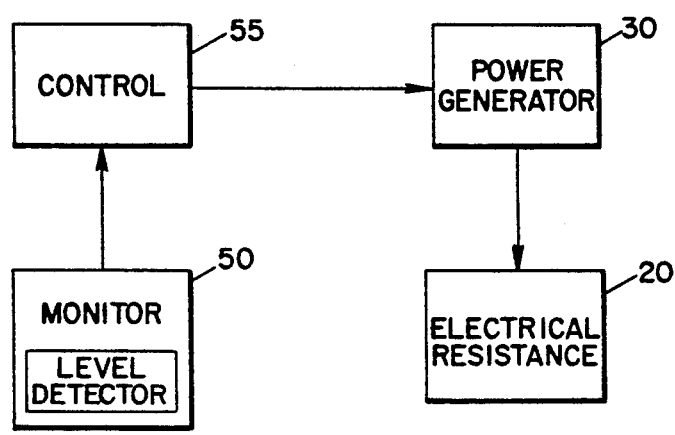

METHOD AND APPARATUS FOR PREVENTING CARRY BACK IN A RAIL CAR USING AN ON-BOARD HEATING DEVICE

BACKGROUND OF THE INVENTION

1. Field of the Invention

The invention relates generally to a method and apparatus for preventing or minimizing "carry-back". More specifically, it relates to a method and apparatus for preventing carry-back in coal cars or other transportation vehicles.

2. Description of the Prior Art

Carry-back is commonly a cold weather problem and occurs when the ambient temperature is below freezing. An example of carry-back is the cold weather problem of dirt freezing in the bucket of an excavator. The problem occurs, for example, when the temperature of the bucket is below freezing and the bucket is loading material that has been insulated from the ambient temperature (e.g. material which has been below the frost line). When this condition exists, the loaded material may freeze in thin layers to the inside back corners of the bucket. This is sometimes referred to as striatic layering. One of the reasons that striatic layering occurs in the back corners of the bucket is that the ratio of mass between the bucket and the loaded material and surface area contact between that bucket and the material is greatest in the three surface (side, end and floor) back corners of the bucket. With each succeeding dig cycle of the excavator, another thin layer of loaded material will be added (i.e. striatic layering will occur). This further reduces the capacity of the excavator and prevents the excavator from being able to load and dump 100% of its designed capacity. This is obviously undesirable.

The amount of striatic build-up is proportional to the cycle time of the excavator. This means that as the time interval between loading and dumping increases, there is a proportional increase in build-up, so that each freezing layer will incrementally decrease the actual production capacity of the excavator.

The problem of carry-back is well known in various fields, including the field of material transportation. It occurs in coal cars, excavation equipment and other material transportation vessels, vehicles and devices. For simplicity, however, the invention will be described primarily in connection with a coal car, such as depicted at FIGS. 1A-1C. It is to be understood, however, that the invention is not so limited and that one of ordinary skill in the art will be readily able to apply the teachings of this invention to other devices where carry-back is a problem.

Carry-back arises when coal (or other material being transported) adheres to, or otherwise remains in the coal car after a delivery. As a result, the amount of coal which is actually delivered to the destination is less than what is transported. The coal which remains in the coal car after delivery is "carried back" in the coal car when it returns to its point of origin. This is obviously uneconomical. The buyer of the coal does not receive the full amount of coal transported or purchased, the railroad company carries back additional weight and when the coal car returns to its point of origin, the supplier does not have an empty car in which to place a predetermined amount of a particular product.

In coal cars, carry-back may be primarily caused by coal freezing to the coal cars during the colder months (e.g. winter) or due to excess moisture in the coal especially during the warmer or wetter months. At most all times, there is excess surface moisture on the coal.

For example, the typically low-sulfur western coals, in high demand due in part to passage of the Clean Air Act Amendment, are typically 20% to 25% moisture by weight. In addition to the insitu moisture, many points of origin apply additional moisture to the coal through application of water based surfactants to the top of each car load to reduce dust emissions in transit. Other factors may also give rise to the condition of carry-back.

In particular, coal may freeze to the corners of a rail car, starting in the three side corners (side, end and floor). However, depending on the characteristics of the car, carry-back may occur anywhere. For simplicity, the discussion below will refer to the areas where it is desired to prevent or minimize carry-back as the "desired areas".

EXAMPLE 1

If a rail car set (e.g. 115 cars) has a payload of 12,650 tons, and assuming a mining and transportation cost of $13.00 per ton, and a cycle time of 3.5 days over an approximately 3 month period, the total dollars lost due to carry-back, assuming a 1% loss of load due to carry-back, is $1,644.50. If the loss increases to 5%, the total dollars lost jumps to $8,222.50.

EXAMPLE 2

Assuming the same 115 rail car set with a 12,650 ton payload, and further assuming a mining and rail cost of $0.68 per million BTU, a cycle time of 3.5 days over an approximately 9 month period, then a 1% moisture reduction equals 100 BTU. Therefore, the total dollars to be gained by drying the coal 2% in transit (e.g. through the teachings of the present invention provided below) is $264,384.

In Example 1, the total dollars lost was due to the fact that the rail car set was unable to unload 100% of its payload. In Example 2, the total dollars gained is due to the fact that the user of the coal does not have to expend energy to evaporate the moisture extracted from the coal in transit.

While it is common among many practitioners to allow coal to build up in the cars, this is obviously undesirable. However, various attempts have been made to address the problem of carry-back. For example, some have baked rail cars in warming sheds designed for that purpose. This is unnecessarily costly. Others have sprayed chemicals in the cars before loading. This is not always effective and has other potential drawbacks depending on the chemicals used. Still others have tried to pass an independently generated electrical current through the entire car body to melt a frozen payload located therein. This after-the-fact approach is also costly and not very practical. Another approach has been to locate infra-red heaters along the tracks beneath the coal cars.

None of these approaches effectively prevents or minimizes carry-back in a practical, economical manner.

SUMMARY OF THE INVENTION

It is an object of the present invention to overcome these and other drawbacks of the prior art.

Specifically, it is an object of the present invention to prevent, minimize or eliminate carry-back in coal cars and other material transportation vehicles and devices.

It is another object of the present invention to prevent carry-back by providing one or more heating devices at one or more desired areas of a rail car and to supply the heating devices with power obtained from the rotation of the axles of the rail car to avoid the need for additional power supplies or fixed facilities.

It is another object of the invention to utilize the thermal energy of the heating devices in the warmer months to evaporate surface moisture on the coal to prevent moisture caused carry-back and thus increase the heating value (BTU) of the coal.

It is another object of the invention to protect the environment by decreasing the amount of coal wasted due to carry-back and by reducing excessive moisture and by covering the rail cars during transit.

In order to accomplish these and other objects of the present invention, according to one aspect of the present invention, one or more heat shrouds are provided at desired areas of the coal car (or other vehicle) and are supplied with sufficient energy to effectively overcome the problems which can cause carry-back.

For example, in order to prevent coal from freezing in the coal cars, a heat shroud is provided and supplies enough thermal energy to thaw ice to thereby overcome the latent heat of fusion (approximately 80 cal/g) when the ambient temperature is below freezing (32 degrees F.). When the temperature is above 32 degrees F., the thermal energy is used to evaporate surface moisture of the coal to overcome the latent heat of vaporization (approximately 540 cal/g).

Based on experimental data, it has been determined that the application of 6 watts of thermal energy is generally sufficient to keep 1 square foot of surface above freezing at 10 degrees F. For moisture reduction, a relatively proportional amount of energy may be needed. However, various environmental (and other) factors may affect the power requirements. Therefore, it is contemplated to provide monitoring equipment to monitor a variety of factors and to use the output of the monitoring equipment as a feedback signal (or signals) to automatically adjust various parameters associated with the heat shroud.

Additionally, the power supplied to the heat shroud is preferably derived from an electrical generator or alternator connected to one (or more) axle of the rail car to capture the energy of the moving rail car at opportune times (e.g. when the rail car is travelling on a downhill grade or other suitable times considering the power requirements of the rail car itself).

BRIEF DESCRIPTION OF THE DRAWINGS

FIG. 1A is a top view of a coal rail car.

FIG. 1B is a side view of a coal rail car.

FIG. 1C is a frontal view of a coal rail car taken along line A—A of FIG. 1A.

FIG. 2A is a top view of a coal rail car according to one embodiment of the present invention.

FIG. 2B is a side view of a coal rail car according to one embodiment of the present invention.

FIG. 2C is a bottom view of a coal rail car according to one embodiment of the present invention.

FIG. 3 is a frontal view of a coal rail car according to one embodiment of the present invention.

FIG. 4 is a detailed view of a heat shroud according to one embodiment of the present invention.

FIG. 5 is a schematic block diagram of a control circuit for the electrical resistance.

DESCRIPTION OF THE PREFERRED EMBODIMENTS

As shown in FIGS. 2-3, for example, an embodiment of the invention as used in connection with a rail car 10 is described. According to one embodiment of the invention there is provided one or more heat shrouds 20 at locations on the rail car where carry-back is likely to form. In the case of coal rail cars, striatic freezing is likely to occur in the areas of highest surface contact between the rail car body and the coal. These areas are usually at or close to the right angles between the walls and the floor, and especially the corners where the side walls, end walls and floor intersect. By selectively placing the heat shrouds 20 at positions where carry-back is likely to occur, carry-back can be effectively and economically prevented.

Preferably, power may be mechanically transmitted to the shroud from the rotating axle(s) via a power transfer device 30 such as a high amperage generator or alternator to produce sufficient electrical power to the shroud. The generator or alternator may be connected to the axle(s) by means of a sprocket and roller chain assembly which drives a mechanical transmission 40 mechanically coupled to the generator or alternator so that no separate power source is needed to operate the heat shrouds. Other suitable means for connecting the power transfer device (e.g. the generator or alternator) to the axle will be readily apparent to one of ordinary skill in the art.

Preferably, the shroud 20 is an electrical resistance thermal device using carbon or graphite impregnated glass resin, for efficient thermal transfer and insulating qualities. For example, to attain desired electrical resistance to produce heat, Nickel Chromium wire may be used. However, other combinations of materials may be used. A simple combination may comprise a proportional mixture of Carbon or graphite in powdered form combined with a binding agent such as glue. By adding more or less carbon or graphite, the resistance of the thermal device can be raise or lowered. The materials may be sprayed, brushed or poured on the desired areas.

One example of a heat shroud which may be used with the present invention is shown in FIG. 4. As shown in FIG. 4, the heat shroud may comprise three separate components: an insulating layer 21 (e.g. a glass resin); an electrical transfer layer 22 (e.g. a carbon or graphite impregnated binding agent, resistive alloys including but not limited to wire and/or types of materials through which electrical resistance induction produces thermal energy); and a protective layer 23 (such as aluminum or steel).

The insulating component 21 may be attached to the rail car surface 25 in one or more corners along the intersections between the side walls and floor and the intersection between the end walls and floor. Insulation placed on these high contact areas will direct heat to the interior of the rail car, thus preventing conduction through the rail car walls and floor at the desires areas.

The electrical transfer layer 22, comprising, for example, a high resistance wire encapsulated in a carbon or graphite impregnated glass resin and the protective layer 23 (e.g. aluminum or steel) conduct heat and protect the heat transfer material from impact and abrasion from hauled material.

A radio-controlled servo solenoid switch comprising an electronic solenoid and switch gear may be located on the positive pole of the alternator or generator to turn the heating device off and on automatically at predetermined times. For example the heating device may be turned on when it is determined that rail car is travelling on a downhill grade (or when power requirements otherwise permit), since the downhill grade allows the device to use the gravitational energy of the loaded train. Similarly, the heating device may be turned off when it is determined that the rail car is travelling on an uphill grade. These determinations may be made by using an electronic sensor, such as an electrical level detecting device which produces an output signal which may be provided to an electrical relay to open or close the heating circuit by means of the solenoid and switch gear mentioned above. The heating devices may also be manually turned on or off by an operator while the rail car is in motion by means of the radio controlled switch mentioned above. Preferably, a control unit for the radio controlled switch is located in an operator accessible location.

Optionally, a temperature compensating voltage regulator is provided to minimize drag on vehicles. This device comprises a voltage regulator controlled by a programmable thermostat with user selectable maximum and minimum temperature parameters. If the maximum temperature is exceeded, the heating device circuit is opened by means of the solenoid and switch gear. If the temperature is below the minimum temperature, the solenoid and switch gear remain in their normally closed position allowing electrical power to pass through the heating circuit.

A bi-metallic thermal snap switch may be located on each circuit between the servo solenoid switch and the positive pole of the thermal shroud to provide thermal overload protection, and which would be operable to control the circuit if, for example, the voltage regulator malfunctioned.

As shown in FIG. 5, equipment 50 for monitoring various parameters such as load temperature, bearing and brake temperature, methane levels, dust levels and load cells may be located between the axle and the vehicles and may produce output signals indicative of these parameters. These signals may be provided as feedback signals to a control unit 55 located in an operator accessible location or otherwise used to control the amount of energy supplied to the heat shrouds.

As shown in FIGS. 2B-2C, the use of venturi assisted intake ports 60 and exhaust ports 70 formed in the rail car 10 efficiently assists in reducing carry-back due to surface moisture by passively drying the coal. Air intakes located on the bottom of the coal car (or other convenient locations) take in large quantities of air proportional to the area of the intakes times the speed of the train. To prevent small particulates from escaping from the top of the rail cars, the cars may be provided with suitably sized hatch coverings 80 to cover the rail car. Hatch coverings in general are commonly known and will not be described in detail here.

The invention is not limited to use on rail cars. It is also applicable to walking draglines and other material transportation vehicles and devices. Other modifications and uses for the present invention will be readily apparent to one of ordinary skill in the art. The invention is limited only by the claims appended hereto.

What is claimed is:

1. A rail car comprising at least one axle, said rail car further comprising means for preventing carry back in said rail car, said means for preventing carry back comprising:

power generating means operatively connected to said at least one axle for selectively generating a power signal under predetermined conditions when said rail car is in motion;

control means for controlling said power generating means according to said predetermined conditions, said control means comprising level detecting means for detecting whether the rail car is moving uphill or downhill and generating a first control signal when said rail car is moving uphill and a second control signal when said rail car is moving downhill; and electrical resistance means, positioned at predetermined locations in said rail car, responsive to said first and second control signals for selectively receiving power from said power generating means in response to said second control signal and generating thermal energy at said predetermined locations to prevent carry back in said rail car.

2. The rail car according to claim 1, wherein in response to said first control signal said electrical resistance means is prevented from receiving power from said power generating means.

3. The rail car according to claim 1, wherein said second signal determines the amount of power received by said electrical resistance means from said power generating means.

4. The rail car according to claim 1, wherein in response to said second signal, said electrical resistance means is activated.

5. The rail car according to claim 1, further comprising monitor means for monitoring at least one parameter associated with the rail car and generating a parameter indicative signal, and wherein said parameter indicative signal is provided to said control means to control the amount of energy supplied to the electrical resistance means.

* * * * *